United States Patent [19]

Suzuki et al.

[11] Patent Number: 5,075,836
[45] Date of Patent: Dec. 24, 1991

[54] SERIES RESONANT POWER CONVERTER

[75] Inventors: Yoshio Suzuki; Mikio Ito; Yasuo Kii; Ryoji Saito, all of Tokyo, Japan

[73] Assignee: Origin Electric Co., Ltd., Tokyo, Japan

[21] Appl. No.: 641,808

[22] Filed: Jan. 16, 1991

Related U.S. Application Data

[63] Continuation of Ser. No. 320,696, Mar. 8, 1989, abandoned.

[30] Foreign Application Priority Data

Mar. 11, 1988 [JP] Japan .................................. 63-57934
Apr. 21, 1988 [JP] Japan .................................. 63-98695

[51] Int. Cl.⁵ .......................................... H02M 3/337
[52] U.S. Cl. ..................................... 363/17; 363/79; 363/98
[58] Field of Search .................... 363/17, 98, 132, 79, 363/28

[56] References Cited

U.S. PATENT DOCUMENTS

| | | | |
|---|---|---|---|
| 4,488,213 | 12/1984 | Buikema | 363/28 |
| 4,553,070 | 11/1985 | Sairanen et al. | 363/132 |
| 4,679,129 | 7/1987 | Sakakibara et al. | 363/98 |
| 4,691,273 | 7/1987 | Kuwata et al. | 363/17 |

FOREIGN PATENT DOCUMENTS 231756  8/1987  European Pat. Off. .

OTHER PUBLICATIONS

MC 14538B, Motorola, pp. 7-498, 1978.
PLS 105, Signetics, pp. 6-16 to 6-18, 1986.
Handbook of Operational Amplifier Applications, First Edition, Burr-Brown Research Corporation, p. 60, 1963.
"Integrated Circuits", Plessey Co., pp. 1,9,983-993, 1033-1037, 1985.
"Linear and Interface Integrated Circuits", Series E, Motorola, pp. 1-6, 1-7, 4-98 thru 4-117, 1985.
PAL 16R8 Family, Monolithic M.M.I. Memories, pp. 5-26 to 5-28, 5-48, 1988.

Primary Examiner—William H. Beha, Jr.
Attorney, Agent, or Firm—Darby & Darby

[57] ABSTRACT

A series resonant power converter in which a resonant copacitor is commonly used in a series resonant circuit and a parallel resonant circuit, whereby a capacitance of the resonant capacitor can be considerably decreased as compared with that of a tank circuit according to a prior art, so that an energy handled by the resonant capacitor can be decreased, which results in decreasing a size of the resonant circuit and also decreasing a power loss. The converter includes means for detecting and computing a voltage applied across a main switch means in its OFF-state and a control circuit for driving the main switch means to its ON-state when the detected and computed value of the voltage drops to a minimum voltage required to sustain oscillation of the series resonant circuit. The minimum voltage is computed by a detecting circuit for detecting an input voltage, a detecting circuit for detecting a voltage of a second resonant circuit and a detecting circuit for detecting a DC output voltage converted to a primary side of a main transformer.

6 Claims, 9 Drawing Sheets

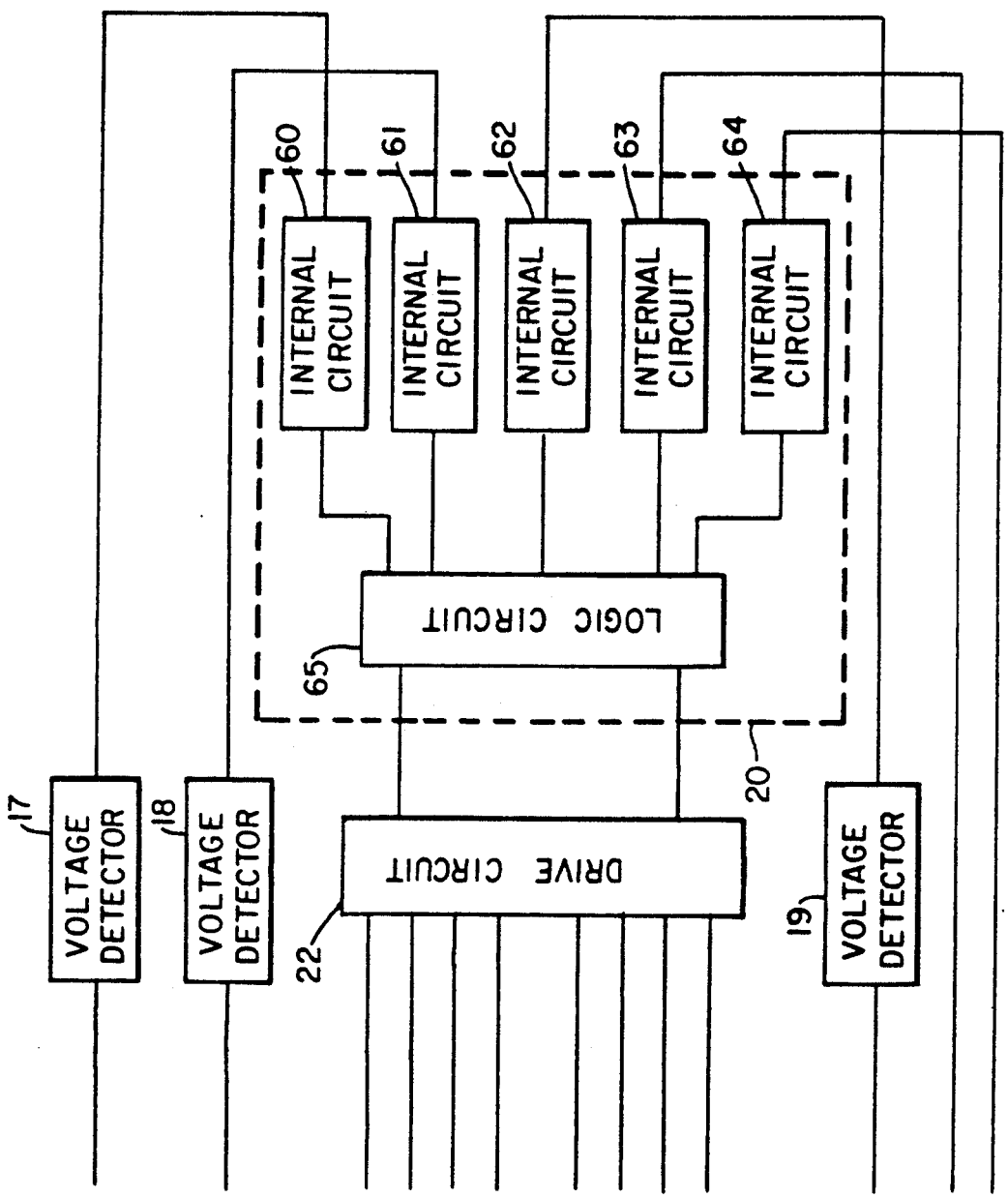

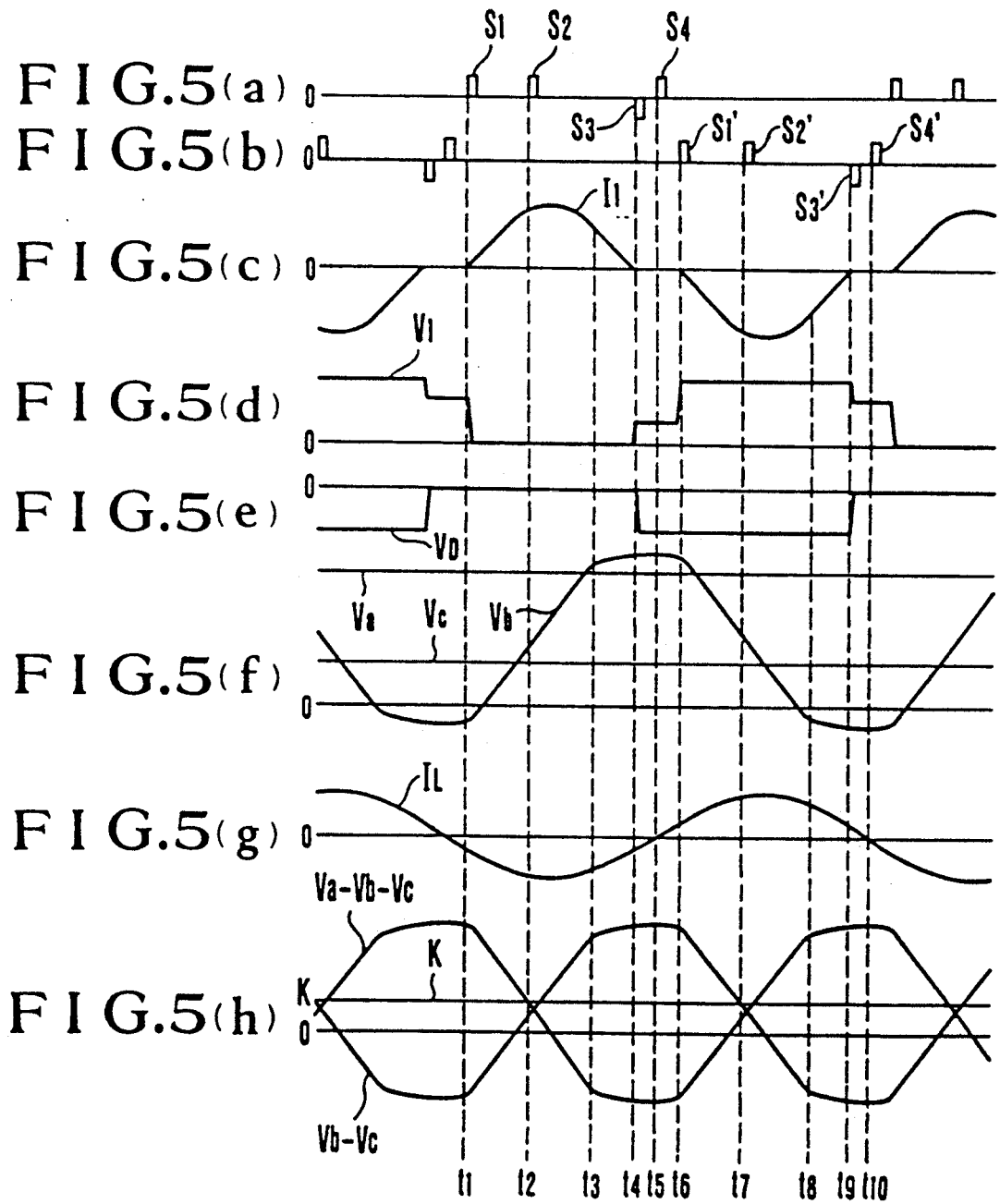

SERIES RESONANT POWER CONVERTER

This is a continuation of application Ser. No. 320,696, filed Mar. 8, 1989, now abandoned.

BACKGROUND OF THE INVENTION

1. Field of the Invention

The present invention relates to a series resonant power converter for producing a desired DC voltage for a load, and a method of controlling such series resonant converter.

2. Description of the Prior Arts

In general, a value of a resonant current of a series resonant converter depends on values of an inductance of a resonant reactor, a capacitance of a resonant capacitor, a DC input voltage and a DC output voltage. Accordingly, many researches have been made on a relationship between these values and the resonant current. As the result of these researches, it has been found that in order to control the output voltage of the series resonant power converter at a constant voltage, without controlling the value of the output current, it is necessary to adjust the value of the output current (average value of the resonant current) by control of OFF-periods of a main switch means (that is, frequency control). However, in the case where the constant voltage control of the power converter is effected by the frequency control method, such problem arises that an operating frequency of the converter, which is in proportional relation to the output current, may drop to an audible range under a light load condition (in the case of less output current), with the result that a noise is produced.

In order to solve such problem, it has been proposed to provide a series resonant converter, as shown in FIG. 3, in which a tank circuit consisting of parallel resonant circuits having an infinite impedance at its resonant frequency is inserted in the series resonant circuit loop, whereby an impedance of the resonant circuit is increased under a light load condition and thus the load dependent characteristic of the operating frequency is minimized.

Now, the series resonant power converter according to a prior art will be explained, with reference to FIG. 3. The series resonant converter shown in FIG. 3 includes a first circuit 13 having switch means 11 and 12, such as bipolar transistors, connected together in series in forward direction, a second circuit 16 having diodes 14 and 15 connected together in series in forward direction, a third circuit 19 having resonant capacitors 17 and 18 connected together in series and a DC power source 21 connected across both ends of these circuits. The switch means 11 and 12 are arranged in forward direction relatively to the DC power source 21 but the diodes 14 and 15 are arranged to have opposite polarities. A juncture of the diodes 14 and 15 and a juncture of the resonant capacitors 17 and 18 are connected with each other, and a fourth circuit 24 is connected between the juncture 22 of the resonant capacitors 17 and 18 and a juncture 23 of the switch means 11 and 12. The fourth circuit 24 includes a rectifying circuit 25, a resonant inductor 26 and a tank circuit 27, which are connected in series with each other, and said tank circuit 27 consists of a parallel circuit including a resonant inductor 28 and a resonant capacitor 29. The rectifying circuit 25 consists of a bridge circuit including diodes 31–34. An output capacitor 35 is connected across output terminals of said bridge circuit and a load 36 is connected in parallel with said output capacitor 35.

Now, the operation of the above series resonant power converter will be explained.

As an initial condition, it is assumed that the resonant capacitor 17 has been charged up to a voltage of the DC power source 21 and the resonant capacitor 18 has been discharged to a zero voltage. Under such condition, if the semiconductor switch 11 is turned ON, a current $i_1$ flows from the DC power source 21→the semiconductor switch 11→the diode 31 of the rectifying circuit 25→the load 36 (capacitor 35)→the diode 33 of the rectifying circuit 25→the resonant inductor 26→the tank circuit 27 to the resonant capacitor 18. At the same time, a discharging current $i_2$ flows from the switch means 11→the diode 31 of the rectifying circuit 25→the load 36 (capacitor 35)→the diode 33 of the rectifying circuit 25→the resonant inductor 26→the tank circuit 27 to the resonant capacitor 17. This current is a resonant current which discharges the resonant capacitor 17 and charges the resonant capacitor 18. The capacitance $C_p$ of the capacitor 29 is set at a value higher than the capacitance $C_s$ of the resonant capacitor 17 (or the resonant capacitor 18), so that the voltage of the resonant capacitor 17 becomes zero and the voltage of the resonant capacitor 18 becomes equal to the power source voltage $V_i$, after the lapse of about $\sqrt{2L_s \cdot C_s}\{\pi - \cos^{-1}(V_o/(V_i - V_o))\}$ sec, where $V_o$ is a voltage (output voltage) of the output capacitor 35, $L_s$ is an inductance of the resonant inductor 26 and $V_i$ is a voltage of the DC power source 21. At this moment, the diode 14 becomes conductive and the current which has passed through the resonant inductor 26, flows as the current $i_2$ from the resonant inductor 26→the tank circuit 27→the diode 14→the switch means 11→the rectifying circuit 25→the load 36 (capacitor 35)→the rectifying circuit 25. This current $i_2$ is consumed by the load 36, until it becomes zero.

Thus a half cycle of the operation terminates. Then, if the switch means 12 is turned ON, the resonant capacitor 17 is charged while the resonant capacitor 18 is discharged and the similar operation as described above occurs. Thus the next half cycle terminates.

The resonant frequency $f_1$ of the parallel resonant tank circuit 27 consisting of the capacitance $C_p$ of the capacitor 29 and the inductance $L_p$ of the inductor 28 is expressed by the following equation:

$$f_1 = (2\pi \sqrt{L_p \cdot C_p})^{-1}, \tag{1}$$

and the resonant frequency $f_0$ of the series resonant circuit consisting of the capacitance $C_s$ of the resonant capacitor 17 (or the capacitor 18) and the inductance $L_s$ of the resonant inductor 26 is expressed by the following equation:

$$f_0 = (2\pi \sqrt{L_s \cdot C_s})^{-1}. \tag{2}$$

With regard to the above resonant frequencies $f_1$ and $f_0$, it is required for them to satisfy the following relationship $$f_1 < f_0 \tag{3}$$

To meet such requirement, $f_0$ is set at a value substantially lower than $f_1$ and the impedance of the tank circuit 27 is increased at around $f_1$, so that the minimum operating frequency of the converter is clamped at $f_0$. That is, the operating frequency of the converter should be controlled to be increased so that it becomes higher than an audible range, thereby preventing noise scattering.

On the other hand, to reduce the output current, the operating frequency of the converter should be controlled to be decreased. Under such circumstances, it has been a usual practice to generate parallel resonance in the tank circuit 27 so that the converter can operate under excessively light load and to restrict the input current of the converter to feed only less output current. By using such additional parallel resonant tank circuit, it is possible to operate the converter with good result even under light load condition, without the need of lowering the operating frequency of the converter to the audible frequency range. In general, in order to hold the output voltage or the output current at constant, it is usual to detect a variation thereof thereby automatically controlling the operating frequency.

The converter according to the prior art, as described above, poses some problems to be solved.

Firstly, in the circuit of the series resonant converter according to the prior art, in order to simultaneously satisfy the requirements as expressed by (1), (2) and (3), the capacitance of the resonant capacitor 29 in the parallel resonant tank circuit 27 must have a high value, at least four to five times as high as that of the resonant capacitor 17 or 18. Furthermore, the energy handled by the parallel resonant circuit 27 must have a value corresponding to Q times as high as the energy transmitted to the output side, where Q is the Q factor of the parallel resonant tank circuit. Accordingly, the resonant inductor used must be of large size, with the result that the power dissipation is increased. Furthermore, it is necessary to separately provide a resonant capacitor having a large capacitance, for the tank circuit 27.

Secondly, in the control method for controlling the series resonant power converter according to the prior art, in the case where a negative feedback is applied to the series resonant converter to control its output power, a temporary interruption of the wave form may happen at a transient time responsive to starting of operation, variation of the load condition, variation of input voltage or the like and the operating frequency may drop below the parallel resonant frequency of said tank circuit. In such cases, the impedance of the series resonant circuit loop drops when the operating frequency varies beyond the parallel resonant frequency of said tank circuit, so that the converter is operated in undesirable positive feedback operation rather than negative feedback operation and it becomes impossible to effect a stable control of the converter.

SUMMARY OF THE INVENTION

It is an object of the present invention to eliminate the disadvantages of the circuit of the series resonant converter according to the prior art.

In accordance with the present invention there is provided a series resonant circuit which comprises a first circuit including a first switch means and a second switch means connected in series with each other in a forward direction; a second circuit including a first diode and a second diode connected in series with each other in a forward direction; a third circuit including a first resonant capacitor and a second resonant capacitor connected in series with each other; a DC power source connected across both ends of said first, second and third circuits; a first resonant inductor connected in a path of a main current flowing through said first switch means or said second switch means, said first resonant inductor being connected, at its one end, to a juncture of said first switch means with said second switch means and a juncture of said first diode and said second diode and, at its other end, to a juncture of said first resonant capacitor with said second resonant capacitor; and a second resonant inductor connected, at its one end, to the juncture of said first diode with said second diode and the juncture of said first resonant capacitor with said second capacitor and, at its other end, to a neutral potential point of said DC power source.

According to this invention, the resonant capacitor is commonly used in the series resonant circuit and the parallel resonant circuit and the capacitance of the resonant capacitor can be considerably decreased, as compared with the one used in the conventional tank circuit, so that the energy handled by the resonant capacitor can be decreased. Accordingly, the size of the resonant inductor can be decreased and the power loss can be minimized.

Furthermore in accordance with the present invention there is provided a method of controlling a series resonant converter including a first resonant circuit consisting of one of a first main switch means and a second main switch means which is in ON-state and a main transformer, and a second resonant circuit, in which ON-OFF operation of the first or second main switch means is controlled by an output power control signal, to produce a predetermined DC output power, said method comprising: a step of causing said first or second main switch means to be turned ON by a voltage state detecting signal, thereby avoiding temporary interruption of wave form and sustaining oscillating operation, when a value converted to a primary side from a value of a voltage applied across said first or second main switch means minus an output voltage drops below a reference voltage (K), in the case where the above-mentioned output control signal has not been generated at a transient time owing to variation of the load condition, variation of input voltage or the like.

According to this invention, the series resonant converter as described above includes means for detecting and computing a voltage applied across the main switch means when it is in OFF-state, and a control circuit which is arranged to cause the main switch means to be driven at the time when the voltage computed as above becomes a minimum voltage required to sustain the oscillation of the series resonant converter. This minimum voltage can be computed by a detecting circuit for detecting the input voltage, a detecting circuit for detecting a voltage of the second resonant circuit and a detecting circuit for detecting a DC output voltage converted to a primary side of the main transformer.

This method of controlling the series resonant converter avoids the temporary interruption of the operating wave form which may happen at a transient time such as when operation is started variation of the load condition, is generated or variation of input voltage is generated can be avoided, and the stable control of the converter can be obtained.

Now, the invention will be explained with reference to the drawings.

BRIEF DESCRIPTION OF THE DRAWINGS

FIGS. 4, 4a and 5(a) to 5(h) illustrate another embodiment of the present invention.

DETAILED DESCRIPTION OF THE PREFERRED EMBODIMENTS

Figure 1:
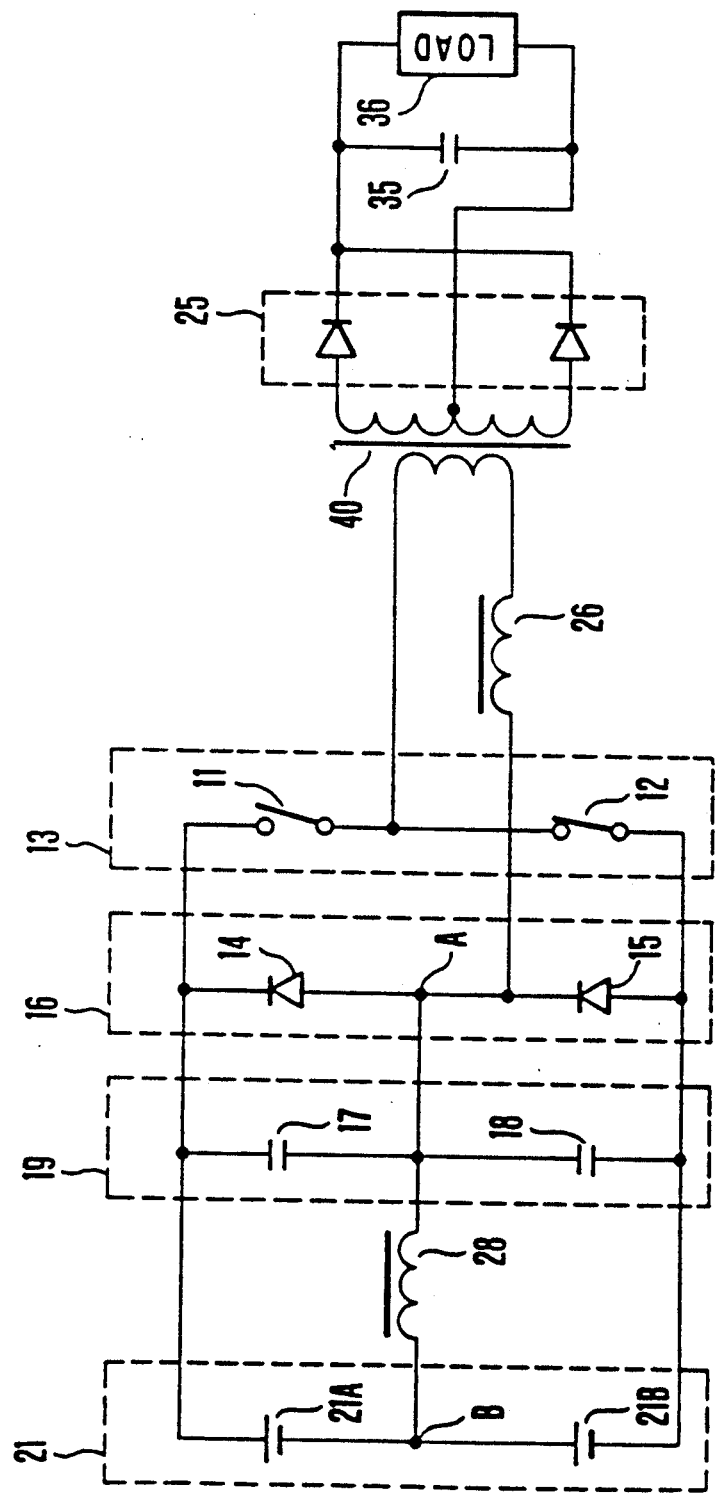
FIG. 1 illustrates an embodiment of the series resonant converter according to the present invention.

Firstly a description will be given to the embodiment of the present invention as illustrated in FIG. 1.

Figure 3:
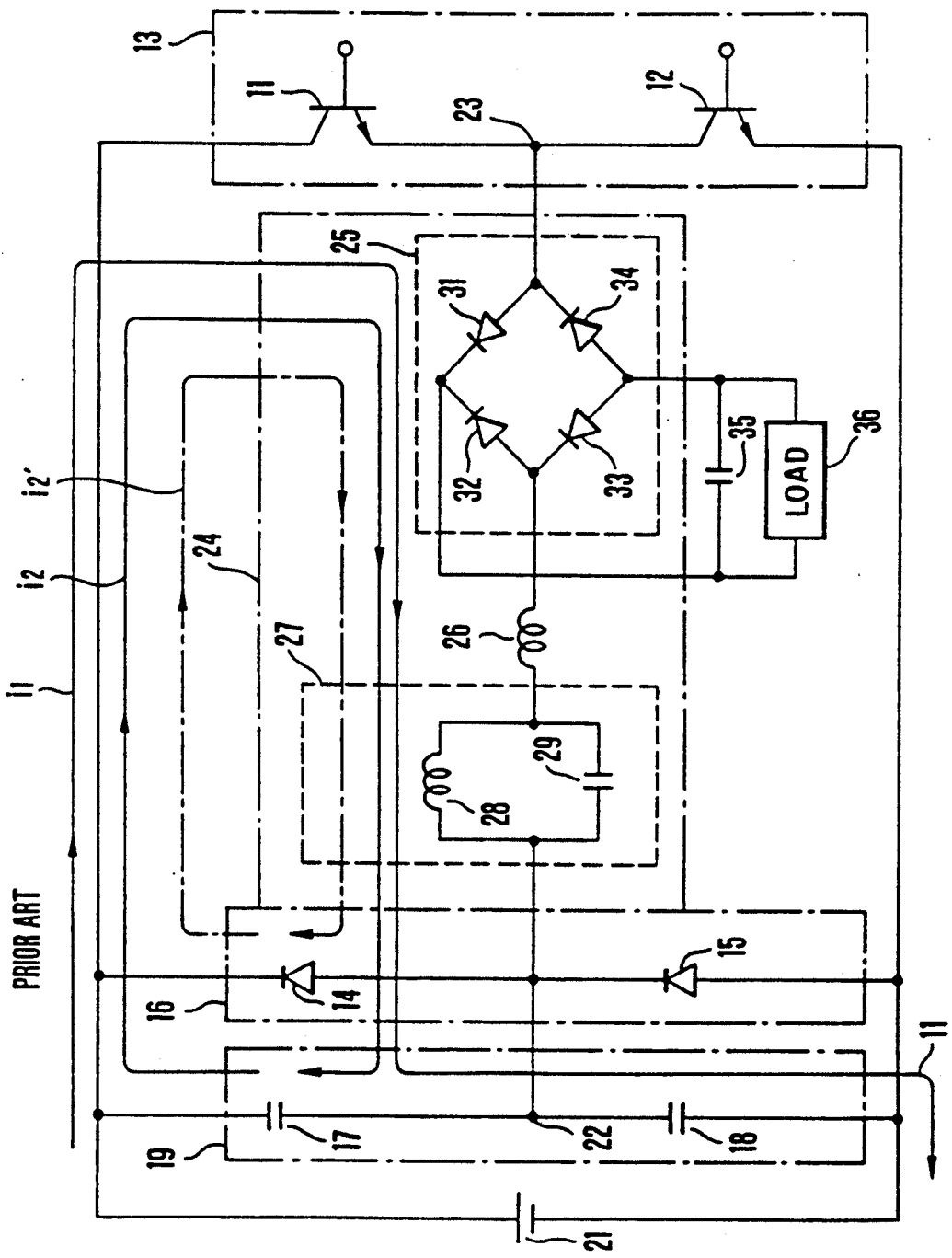
FIG. 3 illustrates a series resonant converter according to a prior art.

In FIG. 1, any components corresponding to those shown in FIG. 3, which illustrates the prior art, are indicated by same numerals as used in FIG. 3.

In FIG. 1, 11 and 12 indicate main switch means; 13 indicates a first circuit; 14 and 15 indicate diodes; 16 indicates a second circuit; 17 and 18 indicate resonant capacitors; 19 indicates a third circuit; 21 indicates a DC power source; 26 and 28 indicate resonant inductors; and 40 indicates a transformer.

In the series resonant power converter as shown in FIG. 1, the resonant inductor 28 is connected, at its one end, to a point A, which forms a juncture between the diodes 14 and 15 of the second circuit 16 and a juncture between the resonant capacitors 17 and 18 of the third circuit 19 and, at its other end, to a neutral voltage point B of the DC power source 21. The resonant capacitors 17 and 18 produces a parallel resonance with the resonant inductor 28, and these resonant capacitor produce series resonance with the resonant inductor 26, respectively. Thus the main current flowing through the first circuit 13 flows through the third circuit 19.

The operation of the above circuit is substantially same as that of the circuit according to the prior art as described above. Now, it is assumed that the switch means 11 is turned ON. Then, a charging circuit from the DC power source 21 through the switch means 11→a primary winding of the transformer 40→the resonant inductor 26→the juncture A to the resonant capacitor 18 is formed. At the same time, a discharging circuit from the switch means 11 through the primary winding of the transformer 40→the resonant inductor 26 to the resonant capacitor 17 is formed. The charging current serves to charge the resonant capacitor 18 up to substantially the source voltage, and after the resonant capacitor 17 has discharged to substantially zero voltage, the diode 14 of the second circuit 16 becomes conductive and the energy accumulated at the resonant inductor 26 is transferred through the diode 14→switch means 11→transformer 40 to the output side. After the OFF period of the switch means 11 and 12, the switch means 12 is turned ON. The ON operation of the switch means 12 is same as that of the switch means 11 and so the detailed description thereof is omitted.

The diodes 14 and 15 are connected in parallel with the resonant capacitors 17 and 18 of the third circuit 19, respectively, and consequently they are not adversely affected by the recovery of the diodes 14 and 15.

Even during the period when both of the switch means 11 and 12 are in OFF-state, the resonant capacitors 17 and 18 together with the resonant inductor 28 generate oscillation at a natural frequency, thereby oscillating the voltage at the juncture A. Under light load condition, the switch means 11 or 12 is turned ON under a state of voltage at the juncture A where a voltage across the switch means 11 or 12 is of a lower voltage (a voltage having small amplitude corresponding to the voltage of the DC power source 21A or 21B minus the voltage of the juncture A), and the amplitude of the voltage applied to the primary winding of the transformer 40 is decreased. As the switching frequency of the switch means 11 and 12 comes closer to the parallel resonant frequency of the resonant capacitor 17 or 18 and the resonant inductor 28, the amplitude of the voltage oscillation becomes larger. Accordingly, under light load condition, the switch means 11 or 12 is switched at a frequency near the above-mentioned parallel resonant frequency.

Under a rated load condition, the switch means 11 and 12 are subjected to switch operation at a considerably higher frequency than the above-mentioned parallel resonant frequency, so that the amplitude of the oscillation of voltage at the juncture A is small. Accordingly the amplitude of the value of the voltage corresponding to the voltage of the DC power source 21A or 21B minus the voltage at the juncture A is high and the voltage applied to the primary winding of the transformer 40 is high.

As explained above, according to the embodiment of the present invention, the resonant capacitor is commonly used in the parallel resonant circuit and the series resonant circuit and the capacitance of said resonant capacitor can be considerably small, as compared to the resonant capacitor used in the tank circuit according to the prior art. Accordingly the energy dissipated by the resonant capacitor can be substantially decreased, so that it is unnecessary to provide a separate resonant capacitor for the parallel resonant circuit, while the size of the resonant inductor can be decreased and the power loss can be decreased.

Figure 2:
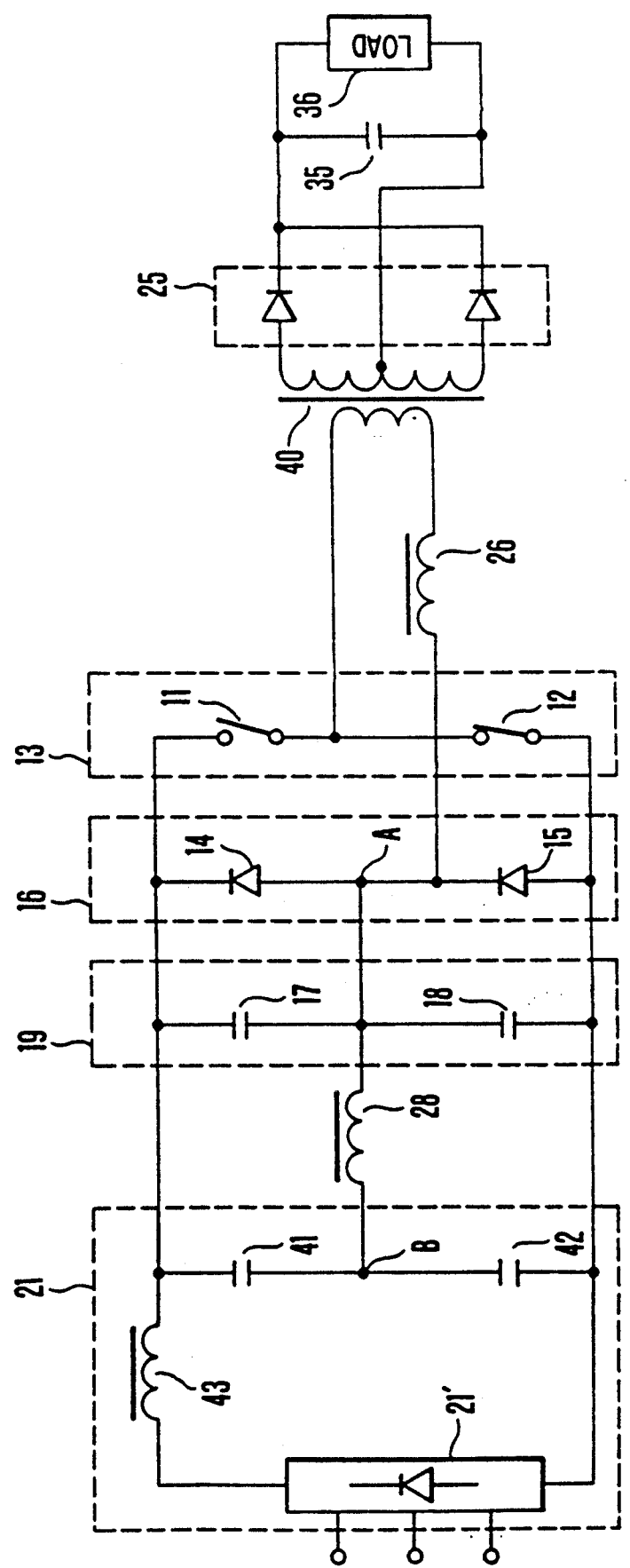
FIG. 2 illustrates another embodiment of the series resonant circuit according to the present invention.

FIG. 2 illustrates a modified embodiment of the present invention. According to the embodiment as shown in FIG. 2, the power source 21' consists of a three-phase full wave rectifier 21', a choke 43 and capacitors 41 and 42. The capacitors 41 and 42 with the choke 43 constitute a filter circuit and substantially half of the DC source voltage is applied to a neutral potential point B. In usual, the capacitors 41 and 42 are designed to have a large capacitance value, which is larger than 10 times as large as that of the resonant capacitor 41 or 42.

Figure 6:
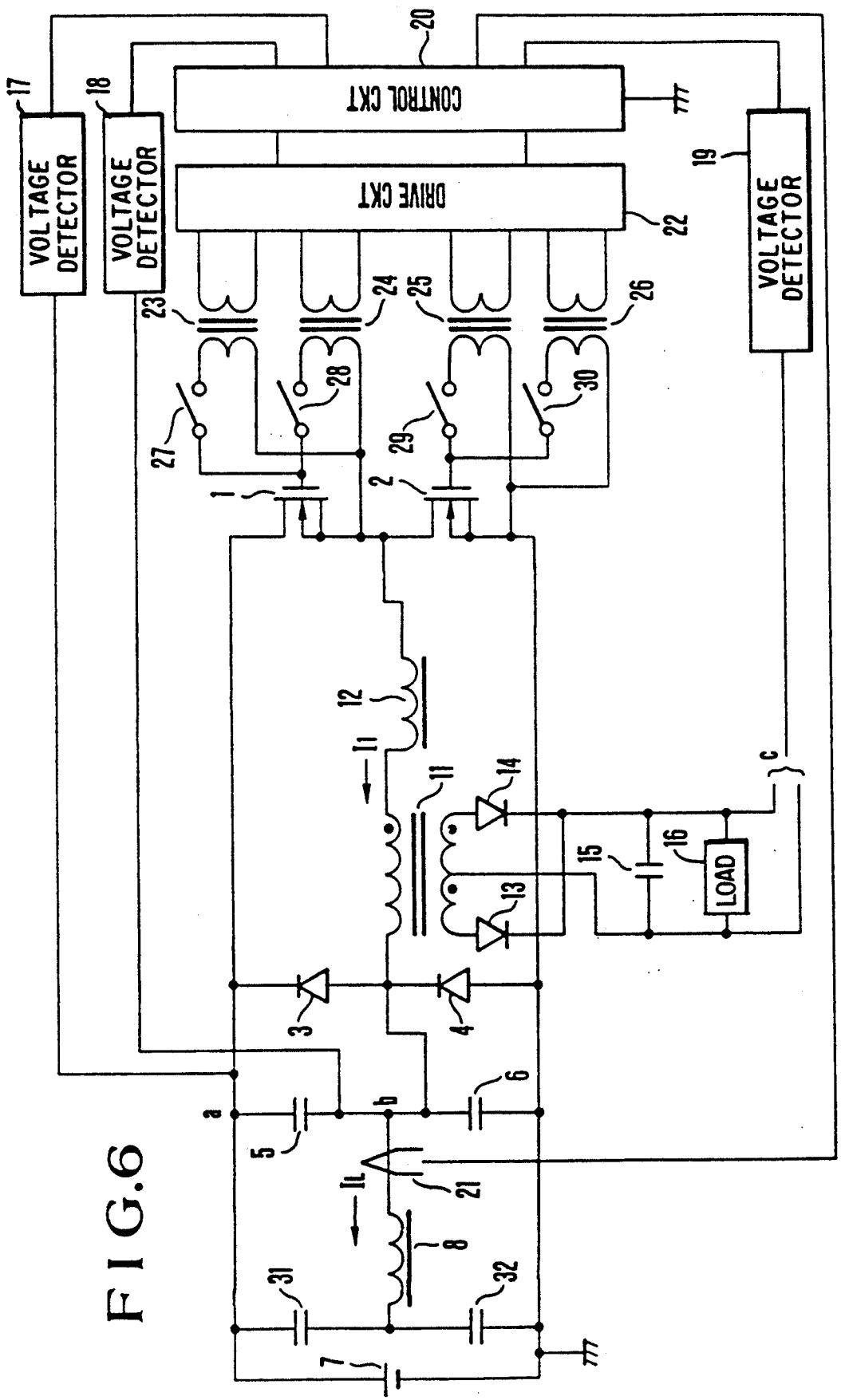
FIGS. 6–8 illustrate further embodiments of the present invention, respectively.
Figure 7:
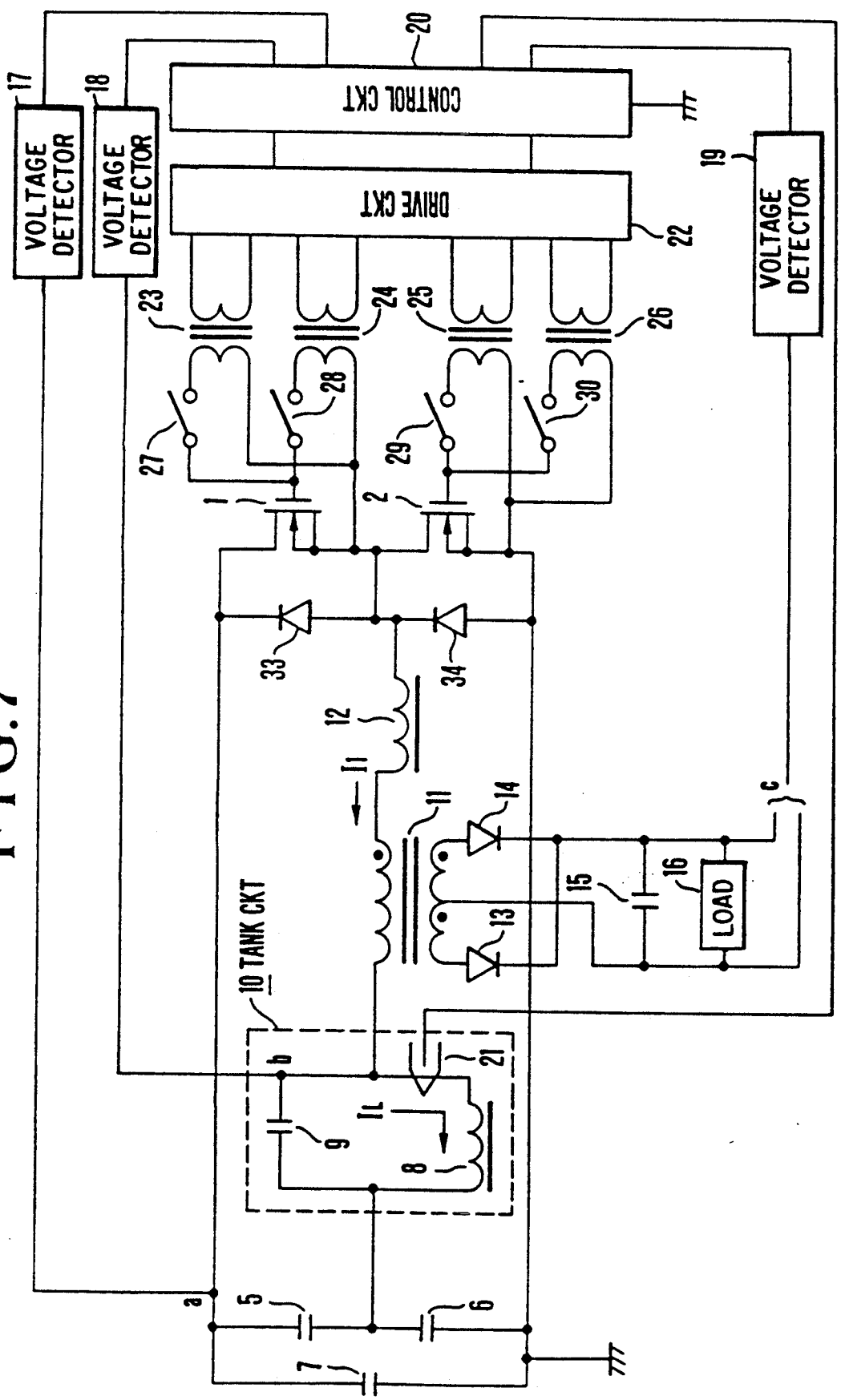
Figure 8:
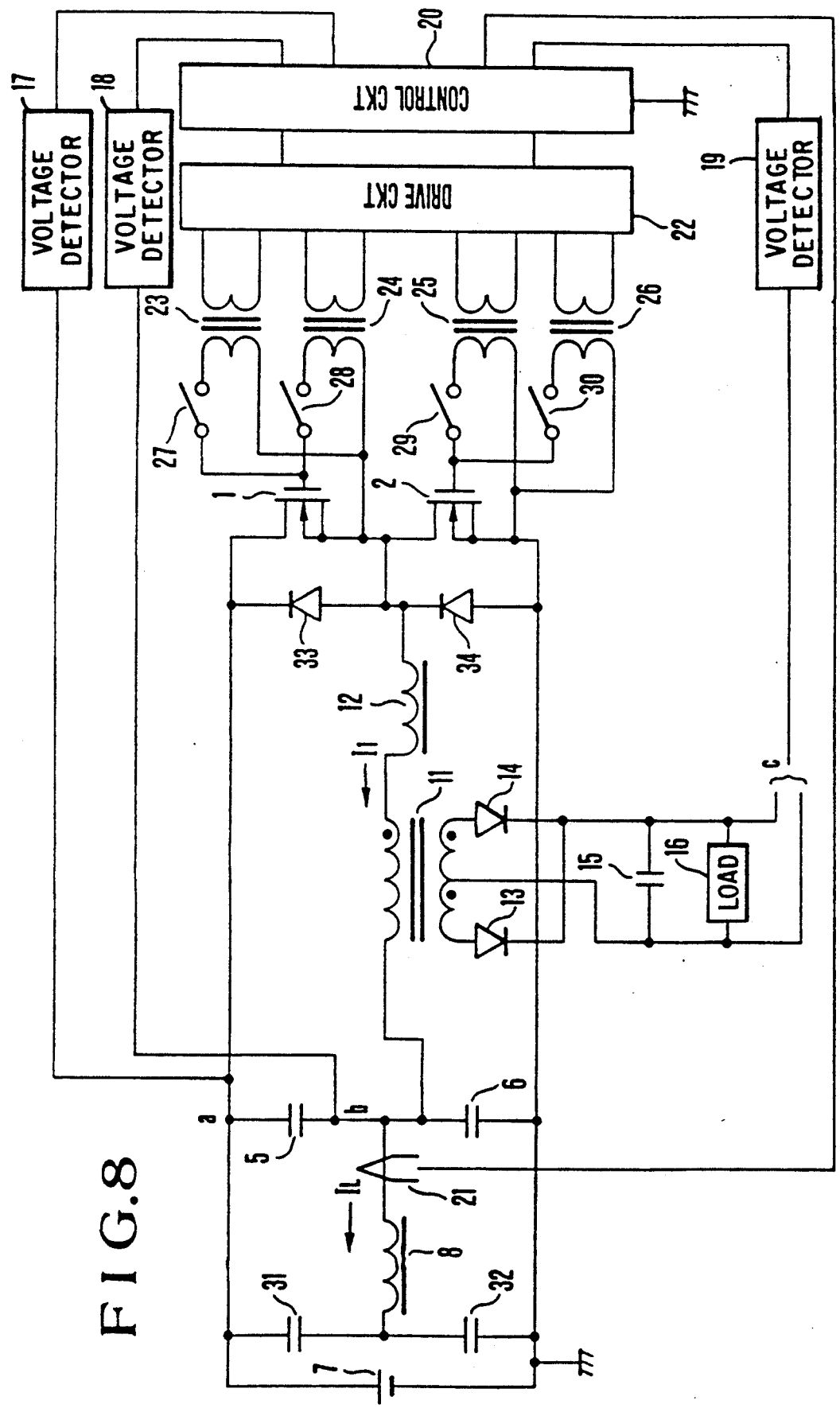

FIGS. 4 and 5(a) to 5(h) illustrate another embodiment of the present invention. FIGS. 6–8 illustrate further embodiments of the present invention, respectively. In these figures, 1 indicates a main switch means; 2 indicates a second switch means; 3, 4, 13, 14, 33 and 34 indicate diodes; 5, 6 and 9 indicate resonant capacitors; 7 indicates a DC input power source; 8 and 12 indicate resonant reactors; 10 indicates a tank circuit; 11 indicates a main transformer; 15 indicates an output capacitor; 16 indicates a load; 17, 18 and 19 indicate a voltage detector; 20 indicates a control circuit; 21 indicates a current detector; 22 indicates a driving circuit; 23–26 indicate a transformer; 27–30 indicate a switch means; and 31 and 32 indicate an input capacitor.

Figure 4:
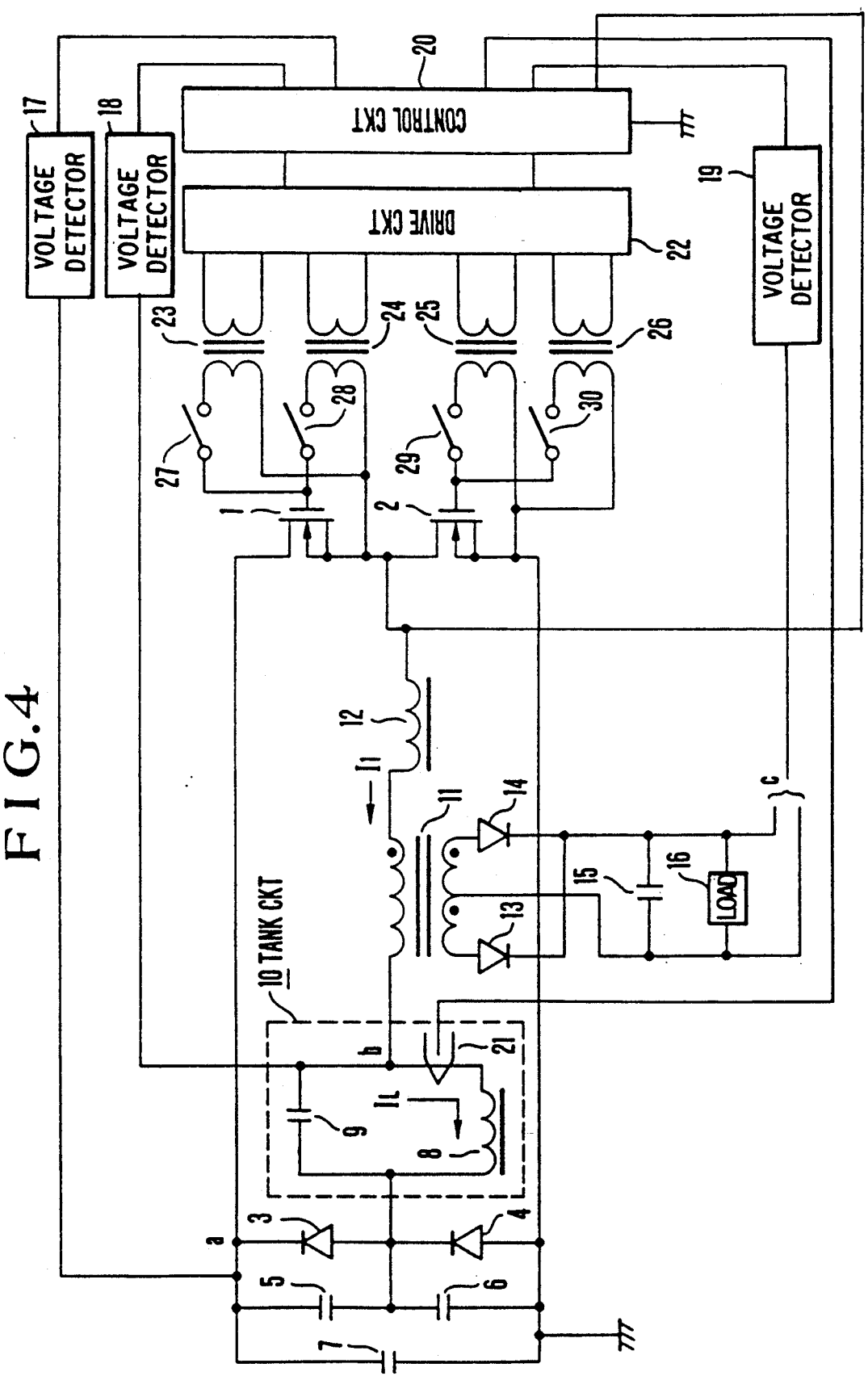

The series resonant power converter shown in FIG. 4 includes a first circuit in which the first main switch means 1 and the second main switch means each consisting of FET are connected in series with each other in a forward direction, a second circuit in which the diodes 3 and 4 are connected in series with each other in a forward direction and a third circuit in which the resonant capacitors 5 and 6 are connected in series with each other, and the DC input power source 7 is connected across these circuits. The main switch means 1 and 2 are arranged in the forward direction relatively to the DC input power source 7, while the diodes 3 and 4 have an opposite polarity to that of the DC power source. A juncture of the diodes 3 and 4 and a juncture of the resonant capacitors 5 and 6 are connected together. The tank circuit 10 consists of a parallel circuit including the resonant inductor 8 and the resonant capacitor 9, and a series circuit including said tank circuit 10, the primary winding of the main transformer 11, and the resonant reactor 12 is connected between said juncture of the diodes 3, 4 and the resonant capacitors 5, 6 and the juncture of the switch means 1 and 2. The output capacitor 15 and the load 16 are connected through the diodes 13 and 14 to the secondary winding of the main transformer 11. A detecting point a for detecting the DC input voltage $V_a$ with reference to the negative terminal of the DC input power source 7, a detecting point b for detecting the resonant voltage $V_b$, that is, the voltage at the juncture of the tank circuit 10 and the primary winding of the main transformer 11, and a detecting point c for detecting the DC output voltage $V_c$, that is, the voltage across the load 16, are connected to the control circuit 20, through the voltage detectors 17, 18 and 19, respectively. The current detector 21, which is arranged in a current path of the resonant inductor 8 and serves to detect the current through said resonant reactor 8 in the direction as indicated by an arrow, is connected to the control circuit 20. The driving circuit 22 is connected with the control circuit 20 to receive a signal therefrom. This driving circuit 22 is so arranged that it feeds ON and OFF signals to the main switch means 1 through the transformers 23 and 24, respectively, while it feeds ON and OFF signals to the main switch means 2 through the transformers 25 and 26, respectively. The switch means 27-30 consisting of transistors, diodes or the like are arranged to turn ON only when the signals are fed thereto, synchronous with the signals fed from the transformers 23-30.

The control circuit 20 is arranged to feed control signals to the driving circuit 22 and drives the main switch means 1 or 2 in the manner as hereinafter described. That is, the control circuit 20 is constituted to generate an ON signal (output power control signal $S_1$, $S_1'$) which acts to produce a required output power, a signal (voltage state control signal $S_2$, $S_2'$) which acts to turn ON the main switch means at the time when the voltage computed by the means for detecting and computing the voltage applied across the main switch means drops to a minimum voltage required to sustain the oscillation of the converter, and a signal (current state control signal $S_4$, $S_4'$) which acts to turn OFF the main switch means at the time when the current through the parallel resonant tank circuit is detected to be zero. These signals operate in such manner that a signal fed at a former time acts with priority to a signal fed at a later time in the same period, and within the same period a plurality of ON driving operations of the same main switch means 1 or 2 are inhibited. Such manner of the operation is effected by a logic circuit in the control circuit 20. Also, the control circuit feeds an OFF signal ($S_3$, $S_3'$) which acts to turn OFF the main switch means 1 or 2. The OFF signal $S_3$, $S_3'$ is produced when the current through the main switch means 1 or 2 is detected to drop to a zero value. The measure of producing the OFF signal $S_3$. $S_3'$ has been well known in the art and therefore, a detailed description thereof is omitted.

As shown in FIG. 4A, control circuit 20 thus includes a number of internal circuits 60, 61, 62, 63 and 64 which are responsive to signals from the main portions of the converter circuit to provide the various control signals, through a logic circuit 65, to the drive circuit 22.

Now the operation of the power converter as shown in FIG. 4 will be described. As an initial condition, it is assumed that the resonant capacitor 5 has been charged up to the voltage of the DC input power source 7 and the resonant capacitor 6 has been discharged to the zero voltage and the operation will be explained with reference to FIG. 5. Under this condition and when the output power control signal $S_1$ as shown in FIG. 5(a) is applied to the gate and source of the main switch means 1 at the time $t_1$, the main switch means 1 is turned ON, so that the charging current flows from the DC input power source 7 through the main switch means 1→the resonant reactor 12→the primary winding of the main transformer 11→the tank circuit 10 to the resonant capacitor 6 and at the same time the discharging current flows through the main switch means 1→the resonant reactor 12→the primary winding of the main transformer 11→the tank circuit 10 to the resonant capacitor 5. This current is a resonant current $I_1$ which serves to discharge the resonant capacitor 5 and to charge the resonant capacitor 6. If the direction indicated by an arrow in FIG. 4 is assumed to be positive, the current is as shown in FIG. 5(c). Referring to FIG. 5, the drain-source voltage of the main switch means is shown in FIG. 5(d), the anode voltage of the diode 14,(cathode is grounded) is shown in FIG. 5(e); The detected voltage $V_a$ at the detecting point a, the detected voltage $V_b$ at the detecting point b and the voltage $V_c$ (which is converted to a value of electromotive force at the primary winding of the main transformer 11 from) the voltage at the detecting point c is shown in FIG. 5(f), and the detected current $I_L$ of the current detector 21 is shown in FIG. 5(g). A predetermined voltage K of which value will be hereinafter described and wave forms of voltages representing results of computation of ($V_a - V_b - V_c$) and ($V_b - V_c$) are shown in FIG. 5(h). When the voltage ($V_a - V_b - V_c$) drops to the predetermined voltage K at the time $t_2$, the voltage state control signal $S_2$, which acts to turn ON the main switch means 1, is generated, but this signal is neglected under the function of inhibiting a plurality of ON-operations of the same main switch means within the same time period. When the voltage of the resonant capacitor 5 becomes zero and the voltage of the resonant capacitor 6 becomes the voltage of the DC input power source 7, at the time $t_3$, the diode 3 becomes conductive at once, and the current $I_1$ flowing through the resonant reactor 12 flows from the resonant reactor 12 through the primary winding of the main transformer 11→the tank circuit 10→the diode 3→the main switch means 1. This current $I_1$ is consumed by the load 16 through the diode 14 and it becomes zero at the time $t_4$. At the time $t_4$ when the current $I_1$ becomes zero, the OFF signal $S_3$ is applied to the main switch means 1. At the time $t_5$, the value of the current detected by the current detector 21 becomes zero, at which the current changes from negative value to a positive value. At this time $t_5$, the current state detecting signal $S_4$, which acts to turn ON the main switch means 1, is generated, but it is neglected under the function of inhibiting a plurality of ON-operations of the same main switch means within the same period. Thus, a half cycle of operation terminates. At the time $t_6$, the output power control signal $S_1'$ as shown in FIG. 5(b) is applied to the main switch means 2. Then the main switch means 2 is turned ON, so that the resonant capacitor 5 is charged and the resonant capacitor 6 is discharged. The same operation as described with reference to the first half cycle is performed and the second half cycle terminates. In the second half cycle, when the voltage $(V_b - V_c)$ drops to the above-mentioned predetermined voltage K at the time $t_7$, the voltage state control signal $S_2'$, which acts to turn ON the main switch means 2, is produced, but this signal is neglected under the function of inhibiting a plurality of operations of the same main switch means within the same period. Under such steady-state operating condition, the operation of detecting the output voltage and applying the detected voltage to the main switch means 1 or 2 is repeated, whereby the operating frequency is automatically controlled to maintain the constant output voltage.

Under the above-mentioned steady-state operating condition if a variation of the load arises to change light (the output current is decreased), for example, it becomes necessary to lower the operating frequency and the output power control signals $S_1$ and $S_1'$ is temporarily stopped. However, in the embodiment as described above, at the time $t_2$ when $(V_a - V_b - V_c)$ drops to the predetermined voltage value K, the voltage state control signal $S_2$ is applied to the main switch means 1, whereby the main switch means 1 and 2 are operated so that the main switch means 2 is turned ON, and thus even during the transient time where the output power control signals $S_1$ and $S_1'$ are not produced, the temporary interruption of the wave form is avoided, so that the negative feedback state is maintained and the stable control can be effected.

The predetermined value K, referred to in the above description, corresponds to a value of the voltage applied to said switch means 1 or 2 immediately before the main switch means 1 or 2 is turned ON by the voltage state control signal $S_2$ or $S_2'$ minus a value conversed to the primary side from the output voltage. This value K must meet such relationship in potential that a current flows when the main switch means 1 or 2 is turned ON and, consequently, it must have a positive value.

If this value falls within a range where the oscillation can be sustained, it is desirable to reduce this value, because the smaller is this value, the closer is the operating frequency to the parallel resonant frequency of the tank circuit 10, so that the current at the breeder resistance can be minimized.

Under a transient state where a usual variation occurs, the oscillation is sustained by the operation of the above-mentioned voltage state control signals $S_2$, $S_2'$ until the output power control signal $S_1$, $S_2$ comes into operation, whereby the steady-state operation can be restored. However, in the case where a considerable variation in the load arises, for example, a variation arises from a heavy load to a light load (and the current considerably decreases accordingly), it is probable that the voltage does not drop to the predetermined voltage K, because of small amplitude of the tank circuit 10 itself and, consequently, small amplitude of tee voltage $(V_a - V_b - V_c)$ and the voltage $(V_b - V_c)$ In such case, both of the output power control signals $S_1$, $S_1'$ and the voltage state control signals $S_2$, $S_2'$ are not generated, but at the time $t_5$ or $t_{10}$ where the resonant current $I_1$ flowing through the resonant reactor 8 becomes zero in the process of changing from negative to positive or from positive to negative, the current state control signal $S_4$, $S_4'$ is applied to the main switch means 1 or 2 to cause the main switch means 1 or 2 to be turned ON. At this time, the oscillating frequency of the tank circuit 10 lowers toward the parallel resonant frequency, so that the operating frequency is decreased and the amplitude of the voltage of the tank circuit 10 itself is increased accordingly, until the output power control signal $S_1$, $S_1'$ operates with priority to the voltage state control signal $S_2$, $S_2'$ and for a while the output power control signal $S_1$, $S_1'$ operates, whereby the steady-state operation is restored. Thus, even in a transient state where both of the output power control signals $S_1$, $S_2$ and the voltage state control signal $S_2$, $S_2'$ are not generated, temporary interruption of a wave form is avoided, so that the negative feedback state is maintained and the stable control of the converter is assured.

In the above descriptions, the present invention is explained with reference to the embodiments where the invention is applied to the constant output voltage control. The present invention can be also applied to a constant current control. Such embodiment will be hereinafter described.

FIG. 6 illustrates a fourth embodiment of the present invention. In FIG. 6, the circuit is so arranged that the resonant capacitors 5 and 6 also perform a function of the resonant capacitor 9 as shown in FIG. 4. The input capacitors 31 and 32 act to divide a potential of the DC input power source 7. The method of controlling the series resonant converter of this embodiment is substantially same as explained with reference to the embodiment shown in FIG. 4. The technical effect obtained is also substantially same as explained with reference to FIG. 4.

FIG. 7 illustrates a fifth embodiment of the present invention. In this embodiment, the diodes 33 and 34 are connected in parallel with the main switch means 1 and 2 but with opposite polarities with respect thereto. The method of controlling the series resonant converter of this embodiment is substantially same as explained with reference to the embodiment shown in FIG. 4 and the technical effect obtained in the former is substantially same as in the latter.

FIG. 8 illustrates a sixth embodiment of the present invention. The circuit arrangement of this embodiment corresponds to a combination of embodiments of FIGS. 6 and 7. The method controlling the converter and the technical effect of the embodiment shown in FIG. 8 are substantially same as those explained with reference to the embodiment shown in FIG. 4.

What is claimed is:

1. A series resonant power converter for avoiding temporary interruption of an operating wave form and for enabling stable control of the converter, comprising:
    means for oscillating the converter to provide current pulses which have a frequency of operation that define an operating wave form for the converter, said oscillating means including a first and a second resonant circuit, said first resonant circuit having a main switch means and a main transformer, said main transformer having a primary winding and a secondary winding;
    rectifying means for producing a direct current output power from said secondary winding of said main transformer;

means for driving said main switch means from an ON-state to an OFF-state for generating said direct current output power;

means for driving said main switch means to said OFF-state in response to a current flowing through said main switch means becoming zero; and means for avoiding temporary interruption of the operating wave form, said avoiding means including means for computing a voltage being applied across said main switch means and means for driving said main switch means to said ON-state in response to said voltage as computed dropping to a minimum voltage required for sustaining oscillation of the converter, whereby the converter may be stably operated.

2. A converter as in claim 1, further comprising means for converting a direct current output voltage into an electromotive force at the primary side of said main transformer, said computing means including means for computing an input voltage, a voltage of said second resonant circuit, and said direct current output voltage.

3. A series resonant power converter according to claim 1, further comprising a first resonant circuit having said main switch means which constitutes one of a first main switch means and a second main switch means, one of which being in the ON-state, said first resonant circuit having said main transformer;

a second resonant circuit;

a control circuit for controlling ON-OFF operation of said first or second main switch means, wherein, said control circuit comprises driving means for driving said first or second main switch means to the OFF-state in order to generate a required DC output power;

a circuit for detecting a current flowing through said one of said first and second main switch means and for driving said first or second switch means to the OFF-state at the time when the detected current becomes zero;

a circuit for detecting a current flowing through said second resonant circuit and for driving one of said first and second main switch means to the OFF-state at the time when said current flowing through said second main switch means becomes zero; and a circuit having means for detecting and computing a voltage applied across one of said first and second main switch means and arranged to drive one of said first and second main switch means to the ON-state at the time when said detected and computed voltage drops to a minimum voltage required to sustain oscillation of the series resonant power converter.

4. A series resonant power converter according to claim 3, wherein said detecting and computing means comprises:

a detecting circuit for detecting an input voltage;

a detecting circuit for detecting a voltage of said second resonant circuit;

a detecting circuit for detecting a DC output voltage converted into an electromotive force at the primary side of said main transformer; and a computing circuit for computing each of these voltages.

5. A series resonant power converter according to claim 4, further comprising:

a tank circuit in series with said primary winding of said main transformer for providing an oscillating frequency;

means for detecting when a current through said tank circuit is zero; and means for turning off said main switch means at a time when the current through said tank circuit is detected to be zero.

6. A series resonant power converter according to claim 4, further comprising:

a load in electrical connection with said secondary winding of said transformer, said avoiding means avoiding the temporary interruption of the operating wave form even when there is a variation in said load from heavy to light.

* * * * *